(12) United States Patent
Diosi et al.

(10) Patent No.: US 7,931,556 B2
(45) Date of Patent: Apr. 26, 2011

(54) AUTOMATIC GEARBOX

(75) Inventors: Gabor Diosi, Friedrichshafen (DE); Josef Haupt, Tettnang (DE); Peter Ziemer, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 643 days.

(21) Appl. No.: 11/993,061

(22) PCT Filed: Jun. 27, 2006

(86) PCT No.: PCT/EP2006/006191
§ 371 (c)(1),
(2), (4) Date: Dec. 19, 2007

(87) PCT Pub. No.: WO2007/003306
PCT Pub. Date: Jan. 11, 2007

(65) Prior Publication Data
US 2010/0222173 A1    Sep. 2, 2010

(30) Foreign Application Priority Data

Jul. 4, 2005 (DE) .................. 10 2005 031 066

(51) Int. Cl.
*F16H 31/00* (2006.01)
*F16H 57/04* (2010.01)
(52) U.S. Cl. .................. 475/116; 475/159
(58) Field of Classification Search .......... 475/159, 475/116; 192/3.52
See application file for complete search history.

(56) References Cited

U.S. PATENT DOCUMENTS

| 2,584,965 | A | * | 2/1952 | McFarland | 477/60 |
| 3,475,992 | A | * | 11/1969 | West, Jr. et al. | 475/146 |
| 3,741,037 | A | * | 6/1973 | Piret | 475/148 |
| 3,834,498 | A | | 9/1974 | Ashfield | |
| 4,719,818 | A | | 1/1988 | McCreary | |
| 5,624,340 | A | * | 4/1997 | Forster | 475/72 |
| 5,846,153 | A | | 12/1998 | Matsuoka | |
| 6,533,692 | B1 | * | 3/2003 | Bowen | 475/5 |
| 6,719,656 | B2 | * | 4/2004 | Bowen | 475/5 |
| 2003/0232675 | A1 | | 12/2003 | Miyazaki et al. | |
| 2007/0042859 | A1 | | 2/2007 | Bader | |

FOREIGN PATENT DOCUMENTS

| DE | 818732 | 10/1951 |
| DE | 203 20 468 U1 | 10/2004 |
| DE | 103 23 254 A1 | 12/2004 |
| FR | 2 535 809 | 5/1984 |
| JP | 09-068262 | 3/1997 |

* cited by examiner

*Primary Examiner* — Tisha D Lewis
(74) *Attorney, Agent, or Firm* — Davis & Bujold, P.L.L.C.

(57) ABSTRACT

The present invention relates to an automatic transmission (1) comprising at least one planetary stage (2) and at least one gear shifting element (3), wherein this gear shifting element (3) is disposed axially directly adjacent to the planetary stage (2), wherein a piston-cylinder arrangement (4) is provided for actuating the gear shifting element (3), wherein the planetary stage (2) comprises an internal gear (5), a sun gear (6) and a planet carrier (7), on which planet gears (8) are rotatably mounted, wherein the planet carrier (7) is connected non-rotatably to a transmission shaft (9), and wherein the pressure medium can be fed to the pressure chamber (10) of the cylinder (11) of the piston-cylinder arrangement (4) through a bore (12, 13) in the transmission shaft (9) and in the planet carrier (7).

19 Claims, 1 Drawing Sheet

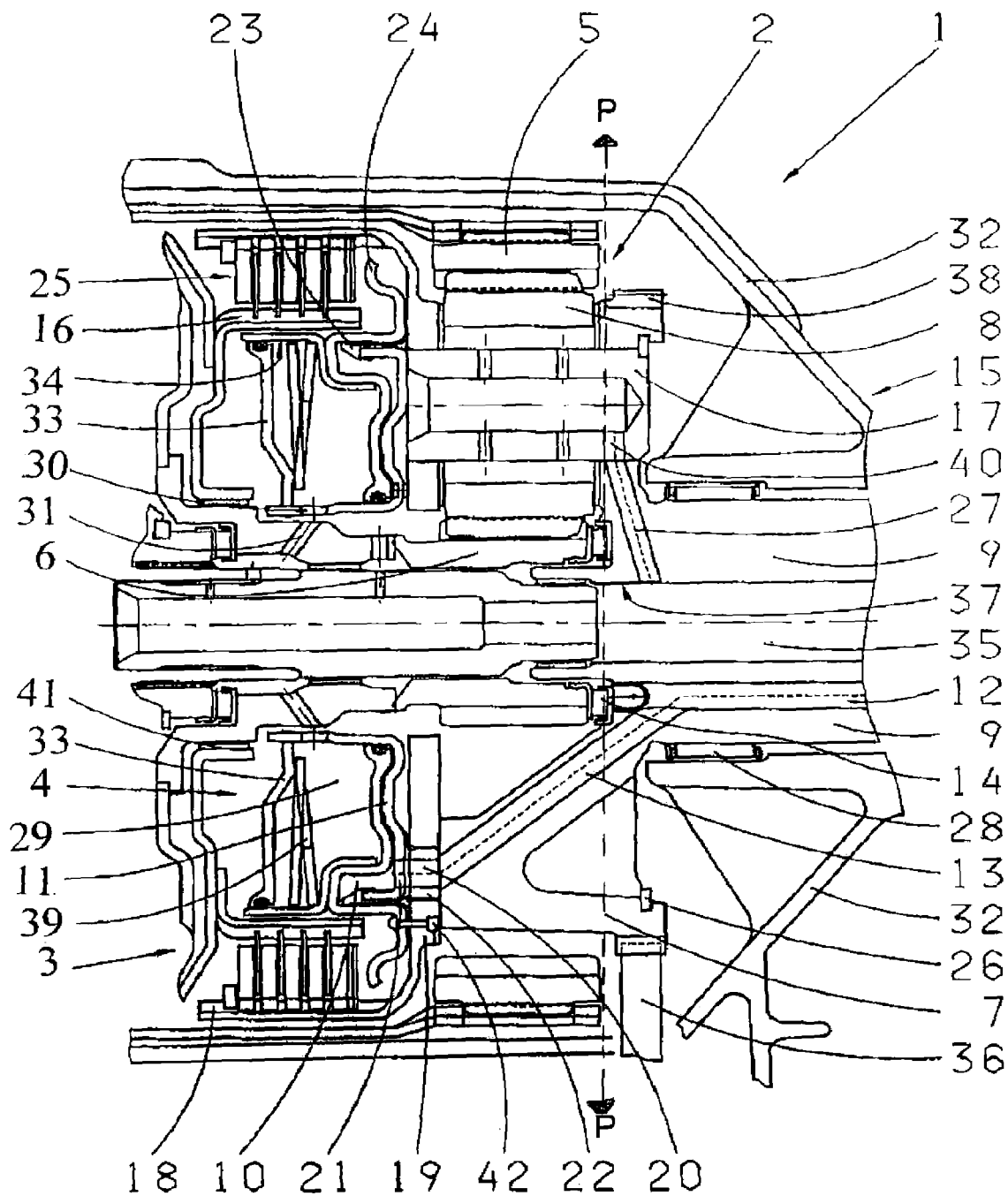

AUTOMATIC GEARBOX

This application is a national stage completion of PCT/EP2006/006191 filed Jun. 27, 2006, which claims priority from German Application Serial No. 10 2005 031 066.4 filed Jul. 4, 2005.

FIELD OF THE INVENTION

The invention relates to an automatic transmission comprising at least one planetary stage and at least one gear shifting element, wherein this gear shifting element is disposed axially directly adjacent the planetary stage, and a piston-cylinder arrangement for actuating the gear shifting element is available.

BACKGROUND OF THE INVENTION

If, for technical reasons, in a transmission of this type the planetary stage is disposed in the transmission housing such that the pressure medium cannot be supplied to the pressure chamber of the piston-cylinder arrangement from the side of the piston-cylinder arrangement facing away from the planetary gearset, the problem arises as to how this supply of pressure medium can concretely be implemented.

SUMMARY OF THE INVENTION

The present invention is based on the knowledge that the supply of pressure medium to the pressure chamber of the gear shifting element can also be carried out from the axial end of the transmission housing, if the pressure medium is conducted through the planetary stage.

Thus, the task underlying the present invention is solved constructively by means of an automatic transmission comprising at least one planetary stage and at least one gear shifting element, wherein this gear shifting element is axially disposed directly adjacent the planetary stage, a piston-cylinder arrangement for actuating the gear shifting element is available, the planetary stage comprises a ring gear, a sun gear and a planet carrier, planet gears are rotatably mounted on the latter, the planet carrier is connected in a rotationally fixed manner to a transmission shaft, and the pressure medium can be fed into the pressure chamber of the cylinder of the piston-cylinder arrangement through a bore in the transmission shaft and planet carrier.

The rotationally fixed connection, between the transmission shaft and planet carrier, is preferably a welded joint. However, it is also possible to produce a transmission shaft of this type with integrated planet carriers as one piece from a workpiece.

When designing this transmission assembly, it can be provided that the bore for the supply of pressure medium to the pressure chamber in the planet carrier is directed radially and axially obliquely via an axial bearing associated with the transmission shaft. By this measure, the distance to the force introduction surface of the axial bearing at the front side of the transmission shaft can be kept comparatively large on the one hand, and on the other hand, a comparatively short oil supply bore that penetrates the planet carrier can be introduced close to the pressure chamber of the piston-cylinder arrangement.

According to an exemplary design of the automatic transmission, the planetary stage is disposed on the output side end of the gear housing, and the transmission shaft, via which the pressure medium is fed, is configured as a gear output shaft, so that the proposed constructive measures are especially effective for accomplishing a transmission of this type.

According to a further characteristic of this automatic transmission, it can be provided that an internal disk support of the gear shifting element is drivably connected to the sun gear of the planetary stage. In this connection, it should be mentioned that the gear shifting element can be a gear clutch or a gear brake.

In an automatic transmission according to the present invention, it is further preferably provided that the planet gears engage the sun gear, engage tooth to tooth with the ring gear and are rotatably mounted on respective planet pins on the planet carrier. These planet pins are inserted into corresponding receiving openings in the planet carrier.

Furthermore, it is provided that an external disk support of the gear shifting element is connected in a rotationally fixed manner to the planet carrier at an axial distance to the planet gears. With this design, free rotation of the planet gears is secured and torque transmission between the external disk support and planet carrier is possible.

According to a further characteristic of the present invention, it is provided that the external disk support of the gear shifting element has a guide disk, or is non-positively connected to one, via which the external disk support is connected in torque transmitting relation to the respective planet pin. The planet pins are preferably only pushed through bores in the guide disk until the front sides of the planet pins and front side of the guide disk are flush with one another.

For the supply of pressure medium to the pressure chamber of the piston-cylinder arrangement it is advantageously provided that there is an axial bore in the guide disk, the bore being connected for reasons of fluid dynamics with one end to the beveled bore in the planet carrier and with the other end opening into an oil passage hole in the cylinder of the piston-cylinder arrangement of the gear shifting element. With this design, a supply path for the pressure medium is accomplished from a pressure medium hole in the transmission shaft via the planet carrier, guide disk and the cylinder.

In order to prevent pressure medium loss along this pressure medium supply path, a further characteristic of the present invention provides that a sealing element is inserted into the bore of the guide disk, the element preventing pressure medium and/or oil from leaking out from between the cylinder and guide disk surfaces lying on top of one another as well as from the guide disk and planet carrier.

This sealing element is preferably vulcanized onto the cylinder of the piston-cylinder arrangement so that, when manufacturing a transmission of this type, the assembly effort compared to an individual variant is advantageously reduced.

For the same reason, it is preferably provided that a further sealant is vulcanized onto the cylinder, the sealant being intended for sealing the pressure chamber of the gear shifting element against a piston disposed axially displaceably inside the cylinder, wherein the piston can be pressed axially against a disk set of the gear shifting element on application of an actuating pressure in the pressure chamber. This sealant is preferable attached to the outer radial end of the cylinder. With this constructive measure it is also achieved that the pressure chamber of the piston-cylinder arrangement is radially adequately sealed in the area where the piston of the piston-cylinder arrangement overlaps the cylinder axially and radially.

According to a further characteristic of an automatic transmission of this type, it can be provided that the cylinder of the piston-cylinder arrangement is connected to the guide disk for securing the axial position of the planet pins, or abuts on the axially secured disk. If a mechanical connection is provided, it can be accomplished by riveting, caulking or welding.

If a mechanical connection of this type should be dispensed with, it can alternatively be provided that the cylinder of the piston-cylinder arrangement abuts on the guide disk, is pressed against the planet pin by the pressure in the pressure chamber and that the planet pins are secured axially on the planet carrier on their further axial end by a locking ring. The locking ring is accordingly provided on the end of the respective planet pins facing away from the pressure chamber.

According to a further embodiment of the present invention, it is provided that bores leading to the planet pins are available in the transmission shaft and/or planet carrier, the bores being likewise directed obliquely via the axial bearing associated with the transmission shaft. With this design, the lubrication of the planet gears is ensured, whereby on the one hand, comparatively short radial oblique bores in the transmission shaft are possible, and on the other hand, an adequately long axial distance to the force introduction surface of the axial bearing at the front side of the transmission output shaft is maintained. Alternatively, the planet gears can be supplied with oil via a gap between the cylinder of the piston-cylinder arrangement and the guide disk, whereby the radial area outside the planet pin must be tight and/or substantially tight.

In this connection, it is also advantageous if the bore for the pressure medium leading to the pressure chamber of the gear shifting element, and the bores for the lubricant leading to the planet pins at the end of the transmission shaft on the side of the planetary stage, viewed axially, open into different oil supply bores configured between the axial bearing associated with the transmission shaft and a radial needle bearing at the transmission output shaft.

Finally, it is deemed advantageous if the cylinder of the piston-cylinder arrangement has an axial length such that it encompasses a pressure equalization space with a section facing away from the pressure chamber together with an axial extension on the piston facing away from the pressure chamber, in which space the lubricant and/or pressure medium can be enclosed temporarily for equalization of the centrifugal forces acting on the pressure medium in the pressure chamber.

BRIEF DESCRIPTION OF THE DRAWINGS

The invention will now be described, by way of example, with reference to the accompanying drawings in which:

The sole FIGURE is a partial cross-section of the output side of an automatic transmission.

DETAILED DESCRIPTION OF THE INVENTION

In this FIGURE, a schematic partial cross-section of the output side of an automatic transmission 1 of the generic kind, wherein in the area of an end 15 on the output side of a transmission housing 32 a planetary stage 2, as well as axially further from this end 15, a gear shifting element 3 configured as a transmission coupling are provided.

The planetary stage 2 comprises a ring gear 5, a sun gear 6, a planet carrier 7 and planetary gears 8, which are illustrated on the upper half of the drawing.

These planetary gears 8 mesh with the ring gear 5 and the sun gear 6, while the planet carrier 7 is connected in a rotationally fixed manner to a transmission shaft 9. The sun gear 6 is configured as a sun shaft in the illustrated example and connected to further transmission parts, which are not shown in detail in the FIGURE. The planet gears 8 are each fixed firmly on the planet carrier 7 by way of planet pins 17 and mounted rotatably thereon. A radial locking ring 26, disposed radially below an external gear wheel 38 of the planet carrier 7 secures the planet pins 17 axially in the direction of the axial output-side end 15 of the transmission housing 32. The external gear wheel 38 of the planet carrier 7 meshes tooth to tooth with the gear wheel 36 implied in the drawing.

The transmission shaft 9 is mounted axially on an axial bearing 14 in an area 37 at the end near the planetary stage, with the rolling elements of the axial bearing 14 being supported axially on the front side of the sun gear 6. Furthermore, in this region 37, the transmission shaft 9 is mounted on the transmission housing 32 by way of a radial needle bearing 28. The axial bearing 14 is coincident with a plane P which extends normal to the transmission shaft 9.

In this case, the gear shifting element 3 is designed as a disk clutch having a disk set 25, an internal disk support 16 and an external disk support 18. The internal disk support 16 is drivably connected to the sun gear 6, both components 6 and 16 being connected to one another by way of a gear wheel system 41. The external disk support 18 is connected in a rotationally fixed manner to a guide disk 19 (upper half of the drawing) or configured in one piece together therewith (lower half of the drawing).

For actuating the gear shift element 3, a piston-cylinder arrangement 4 comprising a cylinder 11, a piston 24 that is axially displaceable inside the cylinder 11 and a disk spring 39 is used, the latter being supported on an extension 34 of the piston 24 facing away from a pressure chamber 10 of the piston-cylinder arrangement 4, and on a section 33 of the cylinder 11 that is far from the pressure chamber. The section 33 that is facing away from the pressure chamber can also be designated as a "sensor plate".

The piston-cylinder arrangement 4 is designed and disposed in a manner such that when pressure is applied to the pressure chamber 10 with a pressure medium, the piston 24 is displaced so far in the direction of the disk set 25 of the clutch 3 that the clutch is engaged. On reduction of the pressure medium pressure, the disk spring 39 resets the piston 24 so that the clutch 3 is disengaged.

In an area facing away from the pressure chamber 10 and planetary stage 2, the cylinder 11 and the piston 24 form a pressure equalization chamber 29 by way of the already mentioned components 33 and 34 that are far from the pressure chamber, the pressure equalization chamber 29 having at least one oil supply opening 30 on the radially internal side of the cylinder 11, such that it can be filled with oil from the transmission housing. Furthermore, a bore 31 in the sun gear 6 is associated with this oil supply opening 30, through which bore oil can be supplied as well. This oil is used in the pressure equalization chamber 29 for pressure equalization in a manner known per se with respect to the centrifugal forces acting on the oil in the pressure chamber 10.

The cylinder 11 of the piston-cylinder arrangement 4 has a sealing element 23 vulcanized thereon, which is configured on the radially outer end thereof, where the piston 24 overlaps the cylinder 11 radially and axially. With this design, the radial rear section of the piston 24 can reach the disk set 25 in an actuating manner and the pressure chamber 10 of the piston-cylinder arrangement 11 is sealed against the internal space of the transmission housing 32 by the sealing element 23.

The axial actuation of the piston 24 required for applying pressure is achieved by filling the pressure chamber 10 with a pressure medium, the transmission oil. For technical reasons, as the supply of pressure medium to the pressure chamber 10 cannot be implemented from the side of the gear shifting element 3 (left-side view in the drawing) facing away from the planetary stage, in this automatic transmission 1 an axial bore 12 is provided in the transmission shaft 9, the bore opening into an oblique bore 13 in the planet carrier 7 near the planetary stage 2.

This bore 13 in the planet carrier 7 ends at the guide disk 19, where there is an axial bore 20. On the other side of the guide disk 19, its bore 20 opens into an axial oil passage opening 21 in the cylinder 11 of the piston-cylinder arrangement 4 so that the pressure medium can flow into the pressure chamber 10.

For sealing the cylinder 11 and the guide disk 19 surfaces lying on top of one another as well as the guide disk 19 and planet carrier 7, a cylindrical seal 22 is inserted into the bore 20 of the guide disk 19 and is vulcanized onto the steel sheet component of the cylinder 11 to reduce the assembly effort.

In order to axially secure the cylinder and the planet pins 17, it can be provided that the cylinder 11 and the guide disk 19 are connected to one another. This can be implemented by riveting (rivet 42), welding or caulking.

As can further be seen from the only FIGURE, the transmission shaft 9 exhibits an axial bore 35, through which the lubricant for the planet gears 8 can be introduced. In addition, there is at least one further oblique bore 27 in the transmission shaft 9, wherein this bore, for reasons of fluid dynamics, is connected to the axial lubricant bore 35 as well as to radial lubricant bores 40 in the planet pins 17. From there the lubricant oil reaches the bearing surfaces of each planet gear 8, via a respective central bore, and further radial bores in the planet pins 17.

The FIGURE illustrates how the oblique bore 13 for the supply of pressure medium to the pressure chamber 10 of the piston-cylinder arrangement 4, as well as the at least one oblique lubricant bore 27, are disposed in the region 37 at the end of the transmission shaft 9 and/or planet carrier 7 near the planetary stage such that they open almost exactly between the axial bearing 14 associated with the transmission shaft 9 and the radial needle bearing 28 into the associated bores 12 and/or 35. The oblique configuration of these bores 13 and/or 27 allows an optimum between the short flow paths and adequate distances between the points of the transmission shaft 9 that are subject to the load of the bearings 14 and 28.

REFERENCE NUMERALS 1 automatic transmission
2 planetary stage
3 gear shift element, clutch
4 piston-cylinder arrangement
5 ring gear
6 sun gear, sun shaft
7 planet carrier
8 planet gear
9 transmission shaft
10 pressure chamber
11 cylinder of the piston-cylinder arrangement
12 bore toward the pressure chamber in the transmission shaft
13 bore toward the pressure chamber in the planet carrier
14 axial bearing
15 output-side end of the automatic transmission
16 internal disk support
17 planet pin
18 external disk support
19 guide disk
20 bore in the guide disk
21 oil passage opening in the cylinder
22 sealing element in opening 20
23 sealing element for the piston sealing
24 piston of the piston-cylinder arrangement
25 disk set
26 locking ring at the planet pin
27 bore in the planet carrier for planet pin lubrication
28 radial needle bearing
29 pressure equalization chamber
30 oil supply opening in the cylinder toward the pressure equalization chamber
31 bore in the sun gear
32 transmission housing
33 cylinder section facing away from the pressure chamber, sensor plate
34 piston extension facing away from the pressure chamber
35 oil supply bore in the transmission shaft for lubricating the planet pins
36 gear wheel
37 region at the end of the transmission shaft near the planetary stage
38 external gear wheel system at the planet carrier
39 disk spring
40 lubricant bore in the planet shaft
41 gear wheel system
42 rivet

The invention claimed is:

1. An automatic transmission (1) comprising at least one planetary stage (2) and at least one gear shifting element (3), the gear shifting element (3) being axially arranged directly adjacent to the planetary stage (2),
a piston-cylinder arrangement (4) actuating the gear shifting element (3),
the planetary stage (2) comprising a ring gear (5), a sun gear (6) and a planet carrier (7), on which planet gears (8) are rotatably mounted, the planet carrier (7) being permanently connected, in a fixed manner to a transmission shaft (9), and
a pressure medium being conducted to a pressure chamber (10) of a cylinder (11) of the piston-cylinder arrangement (4) through an axial bore (12) in the transmission shaft (9) and a bore (13) in the planet carrier (7), the bore (13) in the planet carrier (7) supplying the pressure medium to the pressure chamber (10), and the bore (13) in the planet carrier (7) extending through the planet carrier (7) both radially and axially obliquely with respect to an axial bearing (14) of the transmission shaft (9).

2. The automatic transmission according to claim 1, wherein the planetary stage (2) is arranged on an output-side end (15) of the automatic transmission (1).

3. The automatic transmission according to claim 1, wherein an internal disk support (16) of the gear shifting element (3) is drivably connected to the sun gear (6) of the planetary stage (2).

4. The automatic transmission according to claim 1, wherein the planet gears (8) engage the sun gear (6), engage tooth to tooth with the ring gear (5), and are rotatably supported on the planet carrier (7) by planet pins (17).

5. The automatic transmission according to claim 1, wherein an external disk support (18) of the gear staffing element (3) is connected, in a rotationally fixed manner, to the planet carrier (7) at an axial distance to the planet gears (8).

6. The automatic transmission according to claim 5, wherein the external disk support (18) of the gear shifting element (3) one of communicates with and is integral with a guide disk (19), which is connected to planet pins (17) in a torque-transmitting manner.

7. An automatic transmission (1) comprising:
at least one planetary stage (2), and
at least one gear shifting element (3), the gear shifting element (3) being axially arranged directly adjacent to the planetary stage (2), a piston-cylinder arrangement (4) actuating the gear shifting element (3), the planetary stage (2) comprising a ring gear (5), a sun gear (6) and a planet carrier (7), on which planet gears (8) are rotatably mounted, the planet carrier (7) being connected, in a rotationally fixed manner, to a transmission shaft (9), a pressure medium being conducted to a pressure chamber (10) of a cylinder (11) of the piston-cylinder arrangement (4) through an axial bore (12) in the transmission shaft (9) and an oblique bore (13) in the planet carrier (7), the oblique bore (13) in the planet carrier (7), for supplying the pressure medium to the pressure chamber (10), extending radially and axially obliquely by an axial bearing (14) associated with the transmission shaft (9), wherein an external disk support (18) of the gear shifting element (3) is connected, in a rotationally fixed manner, to the planet carrier (7) at an axial distance to the planet gears (8), the external disk support (18) of the gear shifting element (3) one of communicates with and is integral with a guide disk (19), which is connected to planet pins (17) in a torque-transmitting manner, and the guide disk (19) has an axial guide disk bore (20) which is connected at one end to the oblique bore (13) in the planet carrier (7) and at another end to an oil passage opening (21) in the cylinder (11) of the piston-cylinder arrangement (4).

8. The automatic transmission according to claim 7, wherein a sealing element (22) is inserted into the axial guide disk bore (20) of the guide disk (19) to prevent the pressure medium from leaking out between a surface of the cylinder (11) of the piston-cylinder arrangement (4) and a mating surface of the guide disk (19) and between another surface of the guide disk (19) and a mating surface of the planet carrier (7).

9. The automatic transmission according to claim 8, wherein the sealing element (22) is vulcanized onto the cylinder (11).

10. The automatic transmission according to claim 1, wherein a sealant (23) is vulcanized onto the cylinder (11) to seal the pressure chamber (10) of the piston-cylinder arrangement (4) against a piston (24) arranged to be axial displaceable inside the cylinder (11), and the piston (24) is biased against a disk set (25) of the gear shifting element (3) upon application of an actuating force in the pressure chamber (10).

11. The automatic transmission according to claim 1, wherein the cylinder (11) one of is connected to a guide disk (19) and abuts against the guide disk (19) in an axially secure manner to axially secure planet pins (17).

12. The automatic transmission according to claim 11, wherein the cylinder (11) is one of riveted, welded and caulked to the guide disk (19).

13. The automatic transmission according to claim 12, wherein the cylinder (11) abuts against the guide disk (19) and the planet pins (17) are axially secured to the planet carrier (7) by a locking ring (26) located on an end of the respective planet pins (17) opposite the pressure chamber (10).

14. The automatic transmission according to claim 12, wherein additional bores (27) in at least one of the transmission shaft (9) and the planet carrier (7) extend to the planet pins (17), and the additional bores (27) extend obliquely by the axial bearing (14) associated with the transmission shaft (9).

15. The automatic transmission according to claim 1, wherein the axial bore (12) in the transmission shaft (9) extending toward the pressure chamber (10) of the gear shifting element (3) and additional bores (27) extend toward planet pins (17) at an end (37) of the transmission shaft (9), when viewed axially, open into oil supply bores (12 and/or 35), which are arranged in the transmission shaft (9) on a side of the planetary stage (2) between the axial bearing (14) associated the transmission shaft (9) and a radial needle bearing (28) supporting the transmission shaft (9).

16. The automatic transmission according to claim 1, wherein an axial length of the cylinder (11), a section (33) of the cylinder (11), and an axial extension (34) of the piston (24) define a pressure equalization chamber (29) on a side of the piston(24) opposite the pressure chamber (10).

17. An automatic transmission (1) comprising:

at least one planetary stage (2) comprising a ring gear (5), a sun gear (6), a planet carrier (7), which is rotationally fixed to a transmission shaft (9), and at least one planet gear (8), which is rotatably supported by the planet carrier;

at least one gear shifting element (3) is co-axially adjacent the planetary stage (2), the at least one gear shifting element (3) comprises a cylinder (11) and a piston (24), which is axially slidable in relation to the cylinder (11), the piston (24) and the cylinder (11) define a pressure chamber (10) which is pressurized by a pressure medium; and an axial bore (12) extends axially within the transmission shaft (9) and joins an oblique bore (13) which extends, at an angle, through the planet carrier (7) from the axial bore (12) to communicate with a cylinder bore (21) in the cylinder (11) to the pressure chamber (10), such that pressurizing the pressure chamber (10) with the pressure medium causes the piston (24) to axially slide and actuate the at least one shifting element (3).

18. The automatic transmission according to claim 1, wherein the axial bore (12) joins the bore (13) in the planet carrier (7) which extends both radially and obliquely and communicates with a cylinder bore (21) in the cylinder (11), such that pressurizing the pressure chamber (10) with the pressure medium causes a piston (24) to axially slide and actuate the at least one shifting element (3).

19. The automatic transmission according to claim 1, wherein a plane (P) extends normal to the transmission shaft (9), the axial bearing (14) is coincident with the plane (P), and the plane (P) intersects the bore (13) in the planet carrier (7).

* * * * *